United States Patent
Lindsay

(10) Patent No.: US 9,146,892 B2
(45) Date of Patent: Sep. 29, 2015

(54) METHOD AND SYSTEM FOR IMPROVING PCI-E L1 ASPM EXIT LATENCY

(75) Inventor: Steven B. Lindsay, Bend, OR (US)

(73) Assignee: Broadcom Corporation, Irvine, CA (US)

( * ) Notice: Subject to any disclaimer, the term of this patent is extended or adjusted under 35 U.S.C. 154(b) by 1320 days.

(21) Appl. No.: 11/870,756

(22) Filed: Oct. 11, 2007

(65) Prior Publication Data

US 2009/0100280 A1    Apr. 16, 2009

(51) Int. Cl.
*G06F 13/42* (2006.01)
*G06F 1/32* (2006.01)

(52) U.S. Cl.
CPC .......... *G06F 13/4282* (2013.01); *G06F 1/3206* (2013.01); *G06F 1/3209* (2013.01); *G06F 1/3278* (2013.01); *Y02B 60/126* (2013.01); *Y02B 60/32* (2013.01)

(58) Field of Classification Search
CPC ........ G06F 1/3206; G06F 13/14; G06F 13/36
USPC .................. 713/300, 310, 320, 321, 322, 323
See application file for complete search history.

(56) References Cited

U.S. PATENT DOCUMENTS

| 5,423,020 | A  | * | 6/1995  | Vojnovich ........................ 710/22 |
| 6,018,803 | A  | * | 1/2000  | Kardach ......................... 713/323 |
| 7,043,650 | B2 | * | 5/2006  | Bresniker et al. .............. 713/324 |
| 7,188,263 | B1 | * | 3/2007  | Rubinstein et al. ........... 713/300 |
| 7,392,412 | B1 | * | 6/2008  | Lo ................................. 713/320 |
| 7,607,029 | B2 | * | 10/2009 | Tseng et al. ................... 713/300 |
| 7,647,517 | B2 | * | 1/2010  | Tseng et al. ................... 713/320 |
| 2002/0174252 | A1 | * | 11/2002 | Hayter et al. ................. 709/250 |
| 2003/0061383 | A1 |   | 3/2003  | Zilka |
| 2003/0135676 | A1 |   | 7/2003  | Jensen |
| 2004/0210778 | A1 | * | 10/2004 | Naveh et al. .................. 713/300 |
| 2004/0252692 | A1 | * | 12/2004 | Shim et al. .................... 370/392 |
| 2005/0097378 | A1 | * | 5/2005  | Hwang ......................... 713/320 |
| 2006/0149977 | A1 | * | 7/2006  | Cooper ......................... 713/300 |
| 2006/0218424 | A1 | * | 9/2006  | Abramovici et al. ......... 713/323 |
| 2007/0005997 | A1 | * | 1/2007  | Kardach et al. ............... 713/300 |
| 2007/0025396 | A1 | * | 2/2007  | Ajima ........................... 370/474 |
| 2007/0050653 | A1 |   | 3/2007  | Verdun |
| 2007/0130383 | A1 | * | 6/2007  | Dahan et al. .................... 710/22 |
| 2008/0002603 | A1 | * | 1/2008  | Hutsell et al. ................ 370/318 |
| 2008/0123675 | A1 | * | 5/2008  | Mizusawa ..................... 370/417 |

(Continued)

FOREIGN PATENT DOCUMENTS

EP    1 592 272 A2    11/2005

OTHER PUBLICATIONS

European Search Report in co-pending, related EP Application No. 08016790.1, mailed Jan. 4, 2013.

*Primary Examiner* — Kim Huynh
*Assistant Examiner* — Brandon Kinsey
(74) *Attorney, Agent, or Firm* — Oblon, McClelland, Maier & Neustadt, L.L.P.

(57) ABSTRACT

The disclosed systems and methods relate to improving PCI Express (PCI-E) L1 Active State Power Management (ASPM) exit latency by speculatively initiating early L1 exit based on a network stimulus. Aspects of the present invention may enable a higher level of performance and responsiveness while supporting the benefits of ASPM. Aspects of the present invention may minimize operational cost by reducing latency in processes that utilize a PCI-E interface. Aspects of the present invention may be embodied in a Network Interface Controller (NIC) or any other device with a PCI-E interface that supports ASPM.

22 Claims, 3 Drawing Sheets

(56) References Cited

U.S. PATENT DOCUMENTS

| | | | |
|---|---|---|---|
| 2008/0162964 A1* | 7/2008 | Dahlen et al. | 713/320 |
| 2008/0244287 A1* | 10/2008 | Kwa et al. | 713/310 |
| 2008/0288798 A1* | 11/2008 | Cooper et al. | 713/322 |
| 2009/0006871 A1* | 1/2009 | Liu et al. | 713/300 |
| 2009/0077395 A1* | 3/2009 | Tsai | 713/310 |
| 2009/0077401 A1* | 3/2009 | Tsai | 713/320 |

* cited by examiner

METHOD AND SYSTEM FOR IMPROVING PCI-E L1 ASPM EXIT LATENCY

RELATED APPLICATIONS

[Not Applicable]

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

The Peripheral Component Interconnect Express (PCI-E) interface may be found in servers, desktops, and mobile PCs. An important power saving feature of PCI-E is Active State Power Management (ASPM). When L1 ASPM is enabled on a given PCI-E link, and the link has been inactive for a period of time (e.g. tens or hundreds of microseconds), the PCI-E link will transition to a L1 state that consumes much less power than the full power, fully functional L0 (on) state. While in the L1 state, the PCI-E clock may be stopped and a PLL may be powered down to save power. However, in order for a given device to start a DMA and transfer data across the PCI-E link, the link must be returned to the L0 state.

The process of transitioning from L1 to L0 is not instantaneous. This period of time is called the "L1 exit latency". The L1 exit latency starts from the point in time a device determines that it needs to make a PCI-E transaction (e.g. a DMA) and initiates the transition to L0. The L1 exit latency ends when the PCI-E link has been fully transitioned to a L0 state. The precise L1 exit latency will depend on the design of the devices at both ends of the PCI-E link, but this may be greater than 20 microseconds if the PLL was not powered down and may be greater than 100 microseconds if the PLL was powered down.

Gigabit and Fast Ethernet Controllers may use a PCI-E bus to interface to the PC since PCI-E is a common high-speed peripheral interface. In addition, it is highly desirable for these Ethernet controllers with a PCI-E interface to support L1 ASPM so that the PCI-E link can automatically be put into a low power state during periods of inactivity on the interface. However, the long L1 latencies may negatively affect network responsiveness and performance. This is because the L1 exit latency can affect the latency that it takes for one network station to process and respond to a network packet that was sent by another network station. At Gigabit Ethernet speeds, even the addition of 10 microseconds of latency may be undesirable in some scenarios involving latency sensitive applications or benchmarks.

The L1 exit latency of a device depends on the physical layer design for that device. Trade-offs can be made between performance, cost, and complexity with the physical layer design. So the range of L1 exit latencies may very greatly from a bit less than 10 microseconds to hundreds of microseconds. Even devices with "lower" L1 exit latency may have exit latency greater than 30 (and sometimes greater than 100) microseconds from L1 when the PCI-E reference clock and PLL have been powered down, since the clock has to be restarted and the PLL has to re-acquire lock when transitioning to L0.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for improving the effective PCI-E L1 ASPM exit latency by speculatively initiating a transition at an earlier point in time, as shown in and/or described in connection with at least one of the figures, as set forth more completely in the claims. Advantages, aspects and novel features of the present invention, as well as details of an illustrated embodiment thereof, will be more fully understood from the following description and drawings.

DETAILED DESCRIPTION OF THE INVENTION

Aspects of the present invention relate to improving PCI Express (PCI-E) L1 Active State Power Management (ASPM) exit latency by speculatively initiating early L1 exit based on a network stimulus. The improved latency may enable a higher level of performance and responsiveness while supporting the benefits of ASPM. Aspects of the present invention may be embodied in a Network Interface Controller (NIC) with a PCI-E interface that supports ASPM. Although the following description may refer to a particular embodiment of a PCI-E interface, many other embodiments may also use these systems and methods. Aspects of the present invention may reduce latency in other processes that utilize a PCI-E interface.

In accordance with various embodiments of the present invention an intelligent NIC may anticipate, based on a network stimulus, the need to exit the L1 state much earlier than normal—well before the NIC would have to actually initiate a DMA. In other words, aspects of the present invention enable a NIC to initiate the L1 to L0 transition well before the device has a pending PCI-E transaction (e.g. a DMA read or write) that is ready to be initiated. In accordance with aspects of the present invention, the NIC may speculatively initiate a transition from the low power, L1 state, to the full power, L0 state. By anticipating and initiating the transition earlier, some of the L1 exit latency may be masked, and the PCI-E link may return to an L0 state faster than it otherwise would. Returning to the L0 state faster may improve performance and responsiveness of the network controller that supports PCI-E Active State Power Management.

The L1 to L0 transition may be initiated by a device once it is requested to initiate a PCI-E transaction. If a NIC receives a packet, the packet may be fully buffered and verified before the DMA requests that the packet data be sent to the host memory. Gigabit (and faster) NICs may fully buffer a packet before requesting a DMA. Slower NICs may only buffer a portion of the packet before requesting the DMA.

To reduce latency, the L1 to L0 transition may be initiated, based on speculation, before the device actually has a pending PCI-E transaction. The L1 to L0 transition may begin when the NIC is able to make a determination that it is highly likely that it will need to make a DMA request in the near future. This may provide a head start of more than 10 microseconds.

Figure 1:
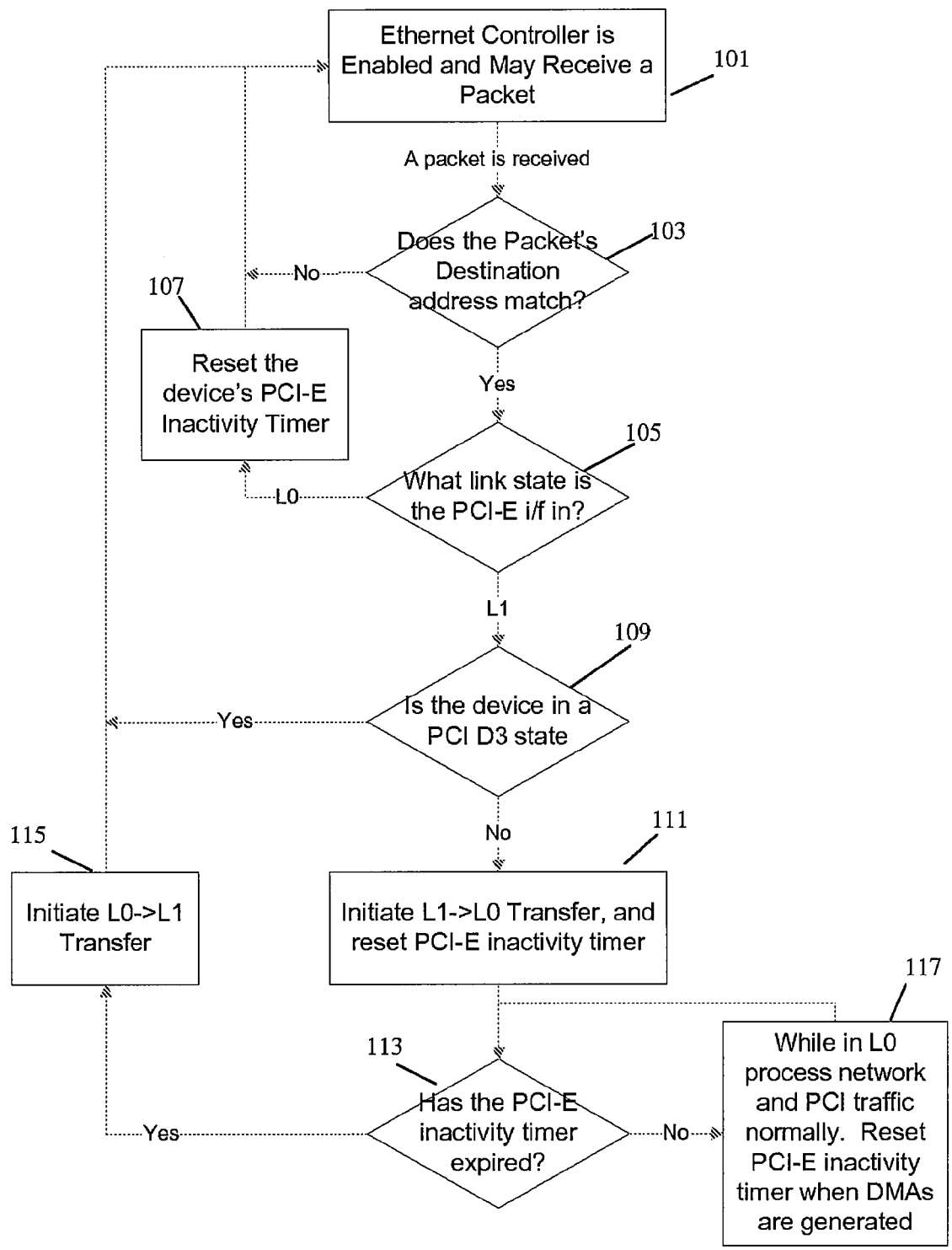
FIG. 1 is a flowchart illustrating a first exemplary method for improving PCI-E L1 ASPM exit latency in accordance with a representative embodiment of the present invention.

FIG. 1 is a flowchart illustrating a first exemplary method for improving PCI-E L1 ASPM exit latency in accordance with a representative embodiment of the present invention. At 101, the NIC is enabled to receive a packet. At 103 as soon as enough of an incoming packet has arrived, the NIC verifies whether the packet passes address filtering. It may be speculated that the packet is error free and will need to be DMA'd to host memory.

At 105, the NIC may determine what state the PCI-E interface is in. If the PCI-E interface is in the L0 state, the device's PCI-E inactivity timer is reset at 107 and the NIC returns to awaiting for a packet at 101. If the PCI-E interface is in the L1 state and the device is found to be in the PCI D3 state at 109, the NIC returns to awaiting for a packet at 101. If the PCI-E interface is in the L1 state and the device is found not to be in the PCI D3 state at 109, the NIC may initiate the L1 to L0 transition and reset the PCI-E inactivity timer at 111. This may be well before the entire packet has been received and may allow the NIC to start the L1 to L0 transition more than 10 microseconds earlier than if the NIC waited for the DMA engine to request a DMA transfer.

By speculatively requesting an "early" L1 to L0 transition, the NIC may transition the bus to an L0 state without actually having to make a DMA request. If the NIC ultimately determines that the packet is erred (e.g. has a FCS error) then the NIC may discard the packet and not initiate a DMA request for that packet's data.

The PCI-E specification allows a transition to L0 even if the transition does not immediate result in a PCI-E transaction. The penalty of making an unnecessary transition from L1 to L0 is that the bus will consume slightly more power for a small period of time. At 113, an inactivity timer is used to determine when the device should transition the link from L0 back to L1 due to inactivity. At 115, the bus transitions back to L1 due to inactivity. If the number of "unnecessary" L1 to L0 transitions is kept to a minimum (e.g. less than 5%), the negative impact of power consumption may be negligible, and the improvement in L1 exit latency may be noticeable and compelling. The error rate on a Gigabit Ethernet network is lower than $10^{-10}$ (per specification), and may be lower than $10^{-12}$ for most media types. Thus the packet error rate on an Ethernet network should be well less than 1%.

To prevent unnecessary L0 to L1 to L0 transitions, the NIC, at 107 and 111, may use the same early indication to reset the NIC's PCI-E inactivity timer earlier than it would have otherwise been reset. By resetting it earlier when certain events occur (e.g. when a packet is received but before the DMA for that packet is ready), unnecessary L1 transitions could be avoided. The PCI-E inactivity timer may be reset at 117 even if the PCI-E link is processing network and PCI traffic while in L0. While this resetting may not improve L1 exit latency, it can reduce unnecessary L0 to L1 to L0 transitions by clearing the inactivity timer earlier when DMA transactions are generated.

Figure 2:
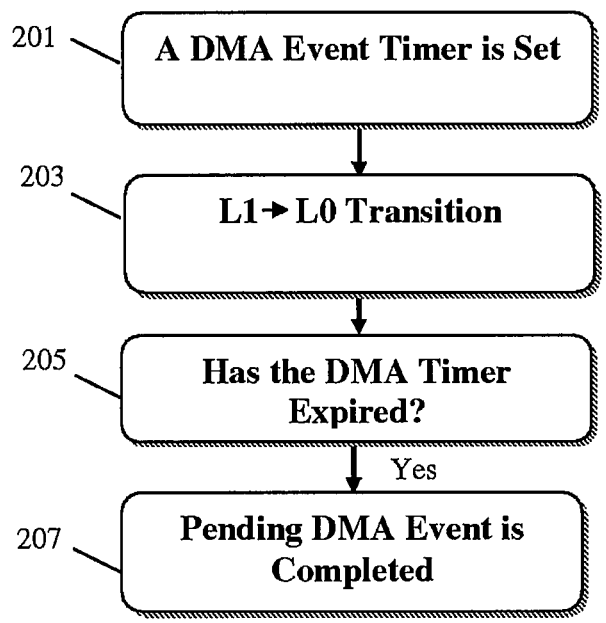
FIG. 2 is a flowchart illustrating a second exemplary method for improving PCI-E L1 ASPM exit latency in accordance with a representative embodiment of the present invention.

FIG. 2 is a flowchart illustrating a second exemplary method for improving PCI-E L1 ASPM exit latency in accordance with a representative embodiment of the present invention.

At 201, a DMA event is scheduled by using a DMA event timer. Once the DMA event timer expires at 205, the DMA event may be initiated at 207. The DMA event may be a "host coalescing" event to update the driver running on the host with current hardware status and generate an interrupt. The DMA event may also be the transfer of current on-chip statistics counters to the host. At 203, the L1 to L0 transition may be started before the DMA event timer expires. By initiating the L1 to L0 transition after a DMA timer is set, but well before timer expires, the device may be configured such that the L1 to L0 transition is completed just before timer expires, thereby completely masking the L1 exit latency time.

Figure 3:
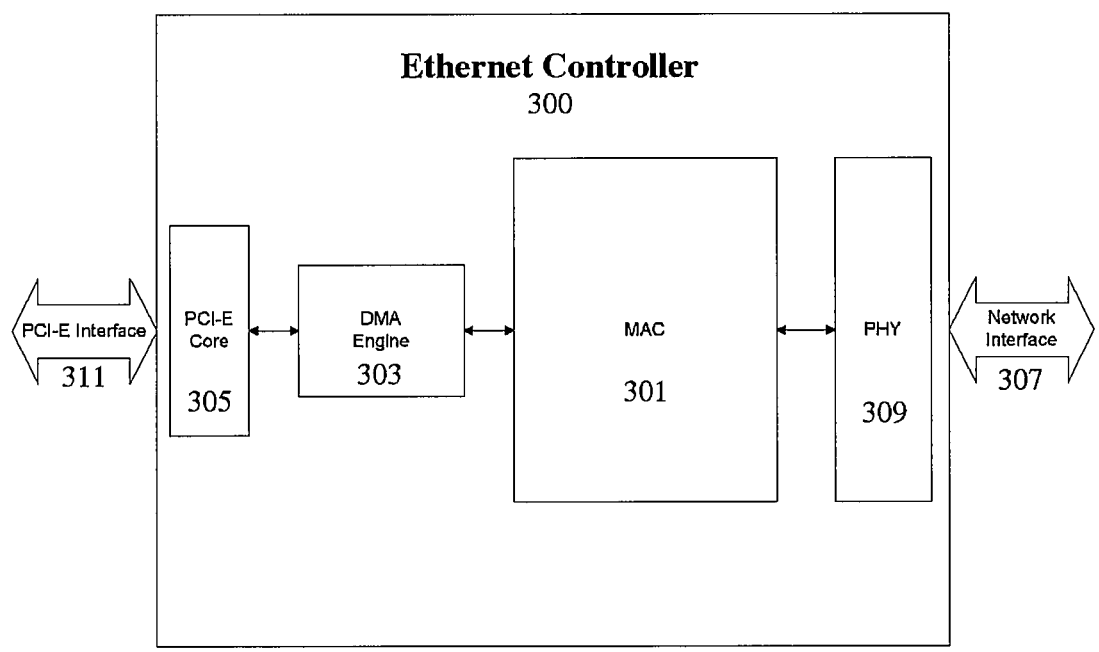
FIG. 3 is an illustration of an exemplary system for improving PCI-E L1 ASPM exit latency in accordance with a representative embodiment of the present invention.

FIG. 3 is an illustration of an exemplary system for improving PCI-E L1 ASPM exit latency in accordance with a representative embodiment of the present invention. FIG. 3 depicts a Gigabit Ethernet Controller, 300. However, the following description may also be applied to other classes of network devices with a PCI-E bus such as WLAN devices.

The MAC, 301, may support: 1) the Ethernet Medium Access Control (MAC) functions; 2) the Ethernet 802.3 protocol; 3) an interface to the physical layer (PHY); 4) packet classification; 5) error detection logic for incoming packets; and/or 6) memory for temporary packet buffering. The MAC, 301, may also contain: 1) logic for offloading checksum calculations; 2) accelerators for TCP/IP or IPSEC traffic; and/or 3) additional embedded processors. The DMA engine, 303, is responsible for initiating DMA read and write requests to the PCI-E core, 305. The PCI-E core, 305, is responsible for generating the actual DMA requests on the PCI-E bus, supporting PCI-E protocol, and also providing PCI-E target support.

When a packet is received on the Ethernet network, the data in the packet will pass through multiple blocks within the chip. For a received packet, the data will enter the device from the network interface, 307, at the PHY, 309, and get processed by the MAC, 301. The entire packet must be received in order for the MAC to ensure that the packet does not have a FCS (aka CRC) error. If there are no errors with the packet and if the packet is destined for this system, the DMA engine, 303, will form DMA requests to the PCI-E core, 305, to transfer the packet into host memory across the PCI bus, 311.

Gigabit Ethernet NICs may support 1 Gb/s operation, as well as operation at slower speeds such as 100 mb, and 10 mb. When running at slower network speeds, incoming network packets arrive slower. The time it takes to receive a maximum sized Ethernet (1518B) packet at 100 mb may be approximately 122 microseconds, and this amount of time may be greater than the L1 exit latency. The L1 exit latency may be greater than 10 microseconds but less than 64 microseconds if a PLL power down in L1 is not enabled. However, the L1 exit latency may be greater than 100 microseconds if the PLL power down is enabled. Therefore, when operating at 10 mb or 100 mb, and receiving a packet while in a L1 state, it could be desirable to initiate the L1 to L0 transition at a point in time that corresponds to a later point in the incoming receive packet. For example, assume a device running at 100 Mb receives a max sized 1518B Ethernet packet. The time it takes for the max sized incoming packet to arrive (e.g. approximately 120 microseconds) may exceed the L1 exit latency time (i.e. if PLL power down was disabled). Therefore, it may be preferable to not initiate the L1 to L0 transition right after the MAC header of the packet has arrived, but rather at some later point in the packet (1000 B for instance). This may be preferable so that the PCI-E interface is not transitioned to L0 prematurely by a substantial amount of time. Therefore, the preferred implementation of this feature may include a feature that allows the software driver for the NIC to configure a delay factor from the point where the NIC has determined that an incoming packet has passed address filtering, to the point where the NIC should initiate the L1 to L0 transition. This delay factor may either be time based (e.g. in microseconds) or based on amount of data received for a given packet. The software driver may use criteria such as the network speed, whether PLL power down is enabled or disabled, and the expected device L1 exit latency on a particular system, as criteria in determining this delay factor.

To support an early L1 to L0 transition a signal from the MAC, 301, to PCI-E core, 305, instructs the PCI-E core to initiate a L1 to L0 transition. This signal may be edge triggered, and the MAC may generate a pulse when it wants to "hint" to the PCI-E core to go to L0. For debug and diagnostic purposes, the software may enable or disable the use of this signal. This may be accomplished via device specific register bits that could be configured by the device driver.

The PCI-E core, 305, may contain logic to recognize a pulse on this signal. If the feature is enabled at the device level and the device is in a L1 ASPM state and a D0 device state, the PCI-E core, 305, may initiate a L1 to L0 transition when it recognizes the signal asserted (i.e. when it detects a rising edge on this signal). Once the transition had been made to L0, the PCI-E core, 305, may reset the PCI-E inactivity timer, so that if there is no activity on the bus for a certain amount of time, the device would initiate a transition back to L1. This signal should be completely ignored by the PCI-E core if the device is in a D3 state. If the device was not in the L1 ASPM state, and was rather in the L0 state, the device may immediately reset its PCI-E inactivity timer when it detected the pulse on this signal. This would provide the benefit of eliminating a possible unnecessary L0 to L1 to L0 transition if the inactivity timer was close to expiring when the early indication signal was asserted.

To support an early L1 to L0 transition due to packet reception, the MAC, 301, may include logic that allows the MAC, 301, to generate a pulse on the signal to the PCI-E core, 305, to tell the PCI-E core, 305, to start the L1 to L0 transition shortly after the MAC, 301, has determined that an incoming packet has passed address filtering.

An "early L1 exit delay" register may be added, which could be configured by software to delay the pulse that goes from the MAC, 301, to the PCI-E core, 305, by n microseconds or until n bytes of the packet had been received. The register would normally be set to "0" (i.e. no extra delay) in a 1 Gb networking environment, but if the network speed was slower (e.g. 100 mb) a delay value could be used so that the early L1 exit pulse could be generated before the DMA writes for that packet are issued and thus reduce L1 exit latency. With the delay, the pulse would not be as early as when the packet first passes address filtering because that could lead to a L1 to L0 transition that was too early if PLL power-down was disabled. Using the "n bytes" method may have an advantage for 10/100 half-duplex networks in that software could set the delay threshold to be outside the collision window (e.g. the first 64B in the packet).

The delay value may be relative to the length of the packet. The length of the packet may be determined by hardware that examines the typ/len field in the Ethernet header and/or the IP len field in the IP header for non-fragmented IP packets.

NICs may have timers that cause a DMA to be generated when the timer expires. Examples include timers that are used to coalesce interrupt events, coalesce status block update events, or generate a periodic DMA of on-chip statistics to the host. It may be possible to predict when a given timer will expire. To support an early L1 to L0 transition due to the expected near-term expiration of a timer, controlling logic in the MAC, 301, may be modified to generate the "early L1 exit pulse" when the timer reaches a programmed threshold before it expires. For instance, one or more registers may be added to allow the software driver to configure the device to pulse the internal L1 exit signal n microseconds before a given timer expirers. For example if n is equal to 30 for a statistics block update timer that normally expires every second, the device may start the L1 to L0 transition 30 microseconds before the device is ready to issue the statistics block update DMA. If the device is in a L1 ASPM state, this may mask 30 microseconds of L1 exit latency. If the PCI-E link was in a L0 state, this would reset the PCI-E inactivity timer in order to prevent a possible unnecessary L0 to L1 transition before the timer expires.

If the device is in L0 and its PCI-E inactivity timer is close to expiring, the assertion of the signal to do the early L1 to L0 transition may cause an immediate reset of the PCI-E inactivity timer which in turn would prevent a near term transition from L0 to L1. This inactivity timer may be reset again when the actual DMA occurs following the speculative early indication that a DMA would follow soon.

If the device is a D3 state with WoL enabled and it receives a packet, a L1 to L0 transition may not be initiated just because it receives a packet. While in D3, the early L1 exit feature may be disabled within the PCI-E core. If the device receives a WoL packet, it may assert a WAKE# signal, which may wake up the system and lead to a reset of the PCI-E interface.

The present invention may be realized in hardware, software, or a combination of hardware and software. The present invention may be realized in a centralized fashion in an integrated circuit or in a distributed fashion where different elements are spread across several circuits. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method, comprising:
    causing a Peripheral Component Interconnect Express (PCI-E) interface to enter a low power state;
    detecting, when the PCI-E interface is in the low power state and prior to a packet being entirely received by a controller interfacing with a physical layer connection, whether the packet has passed an address filtering;

signaling, responsive to a detection that the packet has passed the address filtering, that a PCI-E transaction is expected to cause the PCI-E interface, which is downstream of the controller, to utilize a full power state; and in response to the signaling, transitioning to the full power state prior to the packet being entirely received by the controller such that the PCI-E interface is in the full power state prior to generation of a data memory access (DMA) request corresponding to the PCI-E transaction.

2. The method in claim 1, wherein the signaling comprises scheduling an event that is initiated in response to a timer expiring.

3. The method in claim 2, wherein the event comprises a status update.

4. The method in claim 2, wherein the event comprises an interrupt generation.

5. The method in claim 2, wherein the event comprises a transfer of a plurality of statistics to a host.

6. The method in claim 1, comprising establishing a predetermined delay between the signaling and the transitioning.

7. The method in claim 6, wherein an amount of the predetermined delay is based on a quantity of data received for the packet.

8. The method in claim 2, comprising establishing a predetermined delay between the signaling and the transitioning.

9. The method in claim 8, wherein an amount of the predetermined delay is responsive to a time.

10. The method in claim 8, wherein an amount of the predetermined delay is based on a quantity of data received.

11. The method in claim 10, wherein the amount of the predetermined delay is based on the quantity of data received relative to a length of the packet.

12. The method in claim 1, wherein the method comprises:
starting an inactivity timer responsive to the signaling; and
initiating a transition to the low power state in response to an expiration of the inactivity timer.

13. A method, comprising:
detecting, when an interface is in a low power state and prior to a packet being entirely received by a controller interfacing with a physical layer connection, whether the packet has passed an address filtering;
signaling, in response to a detection that the packet has passed the address filtering, that a direct memory access (DMA) transaction is expected to utilize a full power state for the interface, which is downstream of the controller; and
in response to the signaling, transitioning to the full power state prior to the packet being entirely received by the controller such that the interface is in the full power state prior to generation of a DMA request corresponding to the DMA transaction.

14. A system, comprising;
an interface having a power management feature, wherein the power management feature comprises a low power Peripheral Component Interconnect Express (PCI-E) state and a full power PCI-E state; and a controller configured to
detect, when the interface is in the low power PCI-E state and prior to a packet being entirely received by the controller, which interfaces with a physical layer connection, whether the packet has passed an address filtering;
responsive to a detection that the packet has passed the address filtering, instruct the interface, which is downstream of the controller, to initiate a transition from the low power PCI-E state to the full power PCI-E state prior to the packet being entirely received by the controller such that the interface transitions to the full power PCI-E state prior to generation of a data memory access (DMA) request corresponding to a future transaction being prepared to occur on the interface.

15. The system in claim 14, wherein the controller is an Ethernet Medium Access Controller (MAC).

16. The system in claim 14, wherein the controller is a Wireless Local Area Network (WLAN) controller.

17. The system in claim 14, wherein the controller is configured to generate delay between a first time when whether the packet has passed the address filtering is detected and a second time when the future transaction is signaled.

18. The system in claim 17, wherein an amount of the delay is based on a quantity of data received.

19. The system in claim 18, wherein the amount of the delay is based on the quantity of data received relative to a total amount of data in a packet.

20. The system in claim 14, wherein the controller is configured to operate at a plurality of speeds.

21. The system in claim 20, wherein an amount of time between a first time when whether the packet has passed the address filtering is detected and a second time when the future transaction is signaled is determined according to a particular one of the plurality of speeds at which the controller is operating.

22. A system, comprising:
an interface having a power management feature; and
a controller configured to
detect, when the interface is in a low power state and prior to a packet being entirely received by the controller, which interfaces with a physical layer connection, whether the packet has passed an address filtering;
in response to a detection that the packet has passed the address filtering, cause the interface, which downstream of the controller, to transition to a full power state prior to the packet being entirely received by the controller such that the interface transitions to the full power state prior to generation of a data memory access (DMA) request corresponding to a future DMA transaction being prepared to occur on the interface; and
reset an inactivity timer in response to the interface being transitioned to the full power state.

* * * * *